United States Patent Office 2,770,475
Patented Nov. 13, 1956

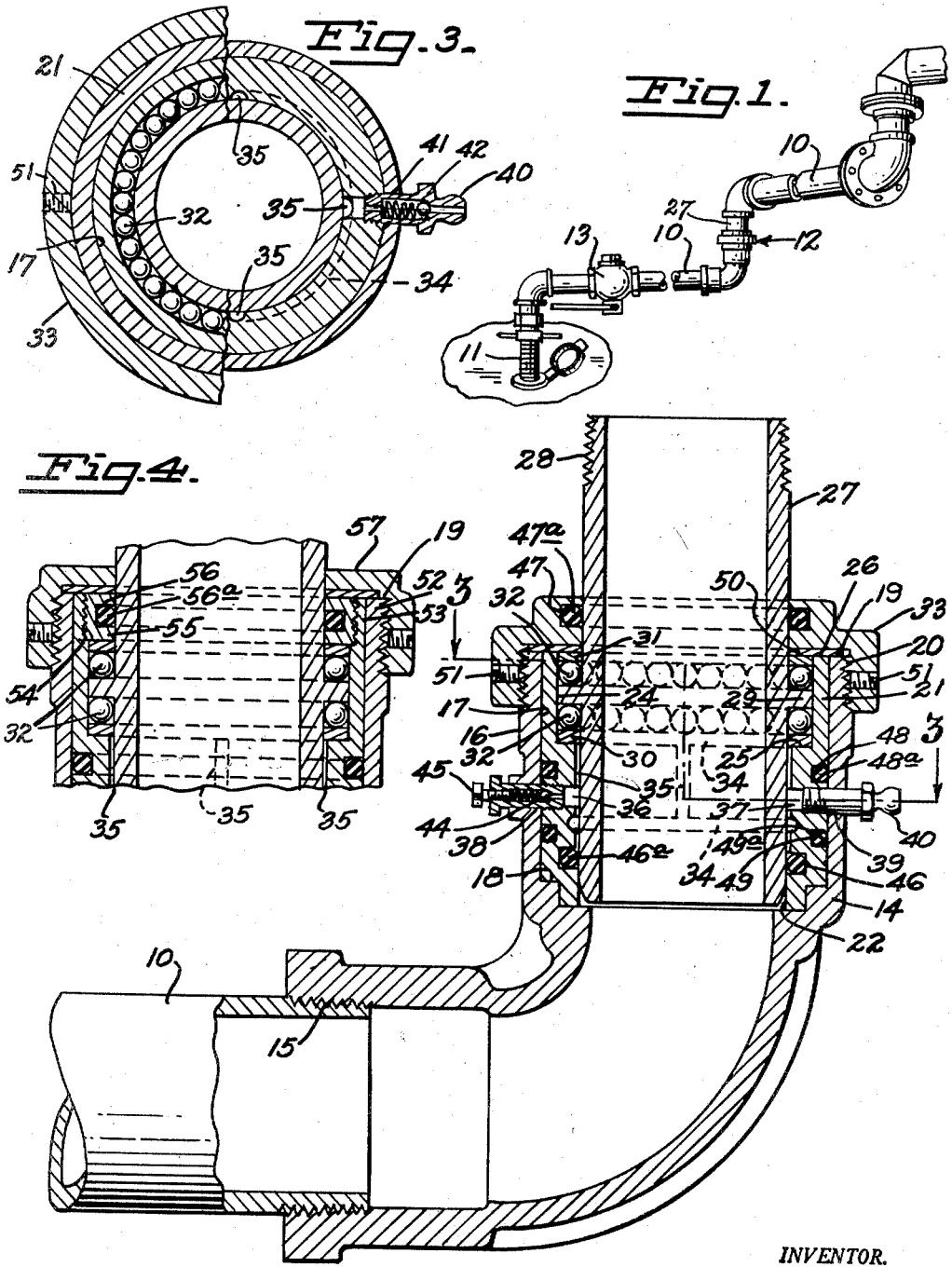

2,770,475
ROTATIVE SWING JOINT COUPLING WITH REPLACEABLE BUSHING

Arthur W. Rafferty, Sacramento, Calif.

Application October 1, 1951, Serial No. 249,029

3 Claims. (Cl. 285—94)

This invention relates to rotative swing joints in conduits and more particularly to such joints having a replaceable self-contained bushing or sleeve and including therewith movable and wearable parts.

Rotative swing joints as contemplated by the invention are advantageously used in any conduit where it is desired to have a rotative joint, and especially an elbow joint, either of single or double elbows. Such joints enable the operator to manipulate a movable system of piping so arranged as to bring a loading valve at the free terminal end of the conduit or of a downspout into convenient relation to the filling dome of a container to be loaded or unloaded, such as a transport vehicle or tank car.

As illustrated herein, one form of use of the invention is to connect an outlet pipe or pipes to swing relatively in a horizontal plane and in which the swing joint coupling is vertical or perpendicular to the pipes which permits an operator to swing the piping assembly to proper position for convenient use. It is to be also understood that the swing joint may be employed in straight line riser conduits, a 90 degree or 180 degree elbow, or when both vertical and lateral movement is required, a plurality of the swing joints may be successively adjoining to provide a double elbow forming substantially a U or S-shaped joint.

For purposes of describing the swing joint of the invention, a single swivel 90 degree elbow is illustrated in the drawing but the same mechanical structure may be extended to all of the forms by connecting a plurality of such joints.

Previous types of swing joints have been made with a connecting nipple acting as a journal and a main joint body as the bearing, and sealing therebetween has been accomplished by conventional compressed packing. Other types of swing joints have also employed anti-friction bearings usually consisting of one or more races of ball bearings operating in grooves formed in the internal wall of the casing or housing of the joint and in the wall of the spigot-nipple.

Because these types of joint require casting and finely machined internal walls, grooves and threads, the main body or housing thereof is most conveniently and advantageously made of readily shaped and relatively soft metal such as brass or bronze. All previous types of swing joints have had the great disadvantage that the leverage of the pipes which extend from the joint cause a heavily unbalanced load which has rapidly caused wear to occur in the rotation bearings. To effect proper sealing in fluid conduits it is necessary that very fine clearances be maintained between the main faucet housing or casing body and the relatively movable spigot or nipple. When wear occurs, load is thrown on the sealing means, such as various types of gasket, resulting in fluid leaks, which is a dangerous condition not permissible in many expensive or combustible liquids such as petroleum products. When such a joint becomes worn in its parts the entire joint must be replaced, since no effective repair can be made because a replacement of merely the sealing gaskets or packings cannot restore the fine clearance required in the metal parts which have become worn. Therefore, the present invention provides a separate replaceable bushing to take the wear of axial rotation and annular wear rings to take the wear of longitudinal thrust and preferably providing anti-friction bearings having races of hard metal and contained in the replaceable bushing or sleeve unit.

The invention consists of a rotative swing joint having a tubular replaceable bushing or sleeve fitted internally of the joint housing or casing to take the wear of axial rotation of a connecting nipple mounted rotatively in the bushing, wear rings of hard metal to take the wear of longitudinal thrust, and sealing members to seal against leakage of fluid in transit and against leakage of lubrication. For joints of relatively large size these are provided with anti-friction ball bearings for rotative purposes mounted in a race of hard metal which preferably includes a wear ring at the longitudinal side of the ball bearings from which the longitudinal thrust of the coupled members is exerted. The invention also includes suitable lubricating means. Should long use create sufficient wear to cause leaks, the self-contained bushing sleeve and the wear rings may be withdrawn from the casing body merely by removing an end closure nut member and pulling the worn members out of the main body housing for replacement by a similar unit. Since there is no wear at any time on the outer casing or housing, replacement of the worn member with a new one of proper size obviously replaces the entire assembly of wearing parts and thus restores the joint quickly and cheaply to good condition.

For illustrative purposes exemplified forms in which the invention may be embodied are described in the specifications herein and illustrated in the accompanying drawings in which:

Fig. 1 is a perspective view of a layout of an application of the joint of the invention.

Fig. 2 is a central vertical transverse section of the joint of the invention.

Fig. 3 is a horizontal transverse section on line 3—3 of Fig. 2.

Fig. 4 is a fragmentary central vertical section of a modification of the device of Fig. 2.

Referring to the drawings in which like reference characters indicate corresponding substantially similar parts, and first referring to the embodiment of the invention shown in Figs. 1, 2, and 3, the reference character 10 indicates a pair of liquid supply pipes mounted to swing relatively in horizontal planes, 11 indicates either a discharge or a filling downspout, dependent on the direction of flow of liquids therethrough, and 12 indicates generally the rotative swing joint of the invention by which the pipes 10 are communicatively connected, while 13 indicates a valve for controlling liquid flow through the pipes.

Referring particularly to the device of Figs. 2 and 3, the swing joint 12 includes a housing or casing 14 which is the main body of the joint and is usually of a 90 degree elbow type, though the joint may also be employed in axially aligned pipes as a rotative connecting joint. One end of the housing or casing body is adapted for connection thereto of a length of conveyor pipe 11 or another similar swing joint, dependent on the plane in which the conduit pipes are to swing relatively, the means for such connection being illustrated as threads 15. The opposite end portion 19 of the housing 14 is open and provides a faucet or bell 16 having an internally reamed cylindrical bore 17 providing a radially inward shoulder 18 at the inner end of the bore. At its free open end 19 the bell is preferably externally threaded as at 20, though bolted flange plates may likewise be employed as shown in Fig. 5, for mounting of its complemental closure collar indicated 33 which has an opening therethrough to snugly fit around a nipple 27 and thus complete the enclosure of the housing.

Within the cylindrical bore 17 is snugly slidably mounted a removable and replaceable tubular cylindrical sleeve bushing 21 of a length to contact at its inner end against the shoulder 18 and be flush at its outer end with the open terminal end 19 of the bore 17.

The sleeve bushing 21 is substantially a self-contained unit which houses the wearing parts and in which any or all of the parts which may become worn or deteriorated may be replaced without necessity for replacing the expensive main body 14 of the joint. At one end, which may be designated the inner end, the bushing 21 seats upon the shoulder 18 of the main body, and adjacent the opposite end its tubular bore 22 is increased in diameter to provide a tubular compartment 24 having an annular shoulder 25 spaced from the outer end 26.

The tubular spigot nipple 27 is rotatively mounted in the bushing bore 22, and in the exemplification of Figs. 2 and 3 this nipple has its inner end substantially flush with the inner end of the bushing, preferably with sufficient clearance of the shoulder 18 of the main body to avoid frictional contact therewith. The opposite or outer end of the nipple extends beyond the bushing and the main body of the joint for connection of the joint in the conduit line of pipe 11, to which it may be connected by any suitable well-known means, such as bolted flanges or as illustrated in Fig. 2, by threads 28. Intermediate its ends and positioned in that portion of the nipple which is enclosed by housing belt 16, the nipple has an external annular bearing flange 29 radially extended from its outer circumference, the bearing flange being of a diameter for snug slidable rotation in the bore of bushing compartment 24. Preferably the nipple and the bearing flange are of harder metal than the housing 14, such as steel, and if desired, the bearing flange may be tempered to an additional hardness, whereas usually the main body 14 and the bushing member 21 are of relatively soft metal to facilitate casting and machining thereof. Spaced relatively on each opposite axially longitudinal side of the radial faces of the bearing flange are removably mounted hardened wear rings 30 and 31 providing bearing surfaces radial to the axis of the coupling for a race of ball bearings 32 between each wear ring and the bearing flange of the nipple. The outer face of ring 31 is flush with the outer ends 26 and 19 of the bushing and main housing body, respectively.

As a part of the enclosing housing, a closure collar cap nut or bonnet 33 is provided at the open free end of the faucet bell to maintain the nipple, the anti-friction bearing assembly and the bushing securely within the bore 17 of the main body housing, and the closure collar member is provided with a central opening through which the nipple 27 extends snugly rotatively, the closure nut having an internally threaded depending annular flange for engaging the threads 20 of the main body. This closure nut or bonnet may have a sealing gasket inset in the wall of its said central opening, as shown in Fig. 2.

The nipple 27 thus has anti-friction rotation relative to the readily replaceable bushing 21 and also relative to the axially longitudinal thrust from either end of the housing, thus eliminating the operational wear on the main body portion 14 of the joint. It is to be noted that there is no relative rotation between the bell faucet body 16 and bushing 21.

Since there is rotation of the nipple relative to the bushing and since one purpose of the invention is to eliminate wear in a swing joint, it is desirable to provide lubrication to the parts which move relatively and carry the weight and thrust of the unbalanced load of the pipes which the swing joint connects, for which reason and purpose lubrication channels are provided to carry lubricant to moving parts and gasket seals are provided to maintain the lubricant within the joint, as well as to seal against leakage of fluid being conveyed by the pipes.

The lubricating channels comprise an annular groove 34 in the internal bore 22 of the bushing preferably more nearly adjacent its inner end portion whereby a lubricant therein may lubricate the inner end portion of the rotatable nipple. A suitable number of axially longitudinal channels 35 are provided in the inner face of the bushing bore, four such channels being efficient, preferably spaced equally at 90 degrees around the inner circumference of the bore. The channels communicate with the annular groove 34 and with the compartment 24 housing the races of the ball bearings and the bearing rings 30, 31.

To the end that it may not be necessary to demount the joint for supplying lubrication or to remove old and devitalized grease, means are provided for supplying lubricant under pressure and evacuating the old devitalized lubricant. Such means comprises a pair of opposite bores 36, 37 through the bushing for communication with corresponding bores 38, 39 of the main body, the bores being preferably disposed in relatively opposite positions through the main body housing and bushing. The bores 36, 37 are in communication with the annular groove 34 and also with the ball race through the axial channels 35. In one of the pairs of communicating bores is mounted a filling nipple 40 with an inlet ball valve 41 loaded outwardly by spring 42, whereas in the opposite bore is mounted a discharge valve 43 having check valve 44 spring loaded inwardly, the spring tension being adjustable in the check valve by nut and plunger 45 to any poundage necessary to maintain the lubricant in the groove channels and ball races, yet openable responsive to a high pressure upon the filling nipple, so that when it is desired to change the lubricant a high pressure flow of lubricant may be injected in the filling nipple 40 and force the elimination of old and used lubricant from the ball race, the lubricating channels and annular groove, thus replacing the used lubricants with a fresh supply.

Inasmuch as lubricant may be introduced under high pressure, and also because the lubricant is usually a petroleum grease which tends to leakage when it is used, it is desirable to provide suitable sealing gaskets both for the lubricant and the liquid in transit. For this purpose grooves are provided in which sealing rings or gaskets may be mounted. Obviously such gasket grooves should be beyond the opposite longitudinal ends of the lubricating grooves and lubricated area. Accordingly one such gasket groove 46 is in the inner face of the bushing bore adjacently below the lubricating supply groove 34 and another such gasket groove 47 is spaced from the ball race at the opposite longitudinal end of the joint, and as shown in Fig. 2 is in the opening of closure collar nut 33 through which the nipple 28 extends. Additional sealing gaskets may also be provided by annular gasket grooves 48, 49 in the outer circumferential wall of the bushing for sealing against leakage of liquid in transit through the coupling, there being preferably one such gasket spaced on each of the opposite sides of the respective filling and discharge lubricating devices 40, 43. The sealing gaskets also seal against leakage of the fluid in transit through the joint. The annular grooves 46, 47, 48 and 49 are substantially square in section and in each is mounted a sealing gasket preferably circular in axial cross section through its body and commonly refered to as an O-ring, the gasket of each groove being indicated by subletter "a" to the groove in which it is mounted. The sealing gaskets are of such body diameter that they normally would have a portion of the body thereof extend slightly beyond the groove opening, whereby the gaskets are slightly compressed into the square grooves, yet present an effective narrow sealing surface in contact with the member against which they seal, thus sealing against leakage but presenting very little frictional resistance to rotation of those sealed parts which are adapted for relative rotation, such as the nipple relative to the bushing and closure nut. A flat sealing gasket 50 may also be employed as a precaution within the closure collar nut 33 between such nut and the adjacent flush ends of the bushing and the housing and wear ring assembly. If desired the closure nut may, when tightened be stayed against loosening rotation by the usual set screws 51.

In Fig. 4 there is disclosed a modification in means for maintaining the nipple, the bearing rings and the ball bearings within the bushing. This modification, requiring some additional expense of material and machining, provides for a completely self contained bushing and nipple which may be removed and replaced as a unit, and thus avoid the inconvenience of loose, unconfined ball bearings when removing and replacing the bushing and nipple assembly. The structure of the joint is generally similar to the joint of Fig. 2 with these noted exceptions. The bushing and the housing portion of the main body are made somewhat longer at the open end 19 so that each has a wall portion 52, 53, extending beyond the ball race compartment and the outermost bearing ring 31. In this extended portion the bore of the bushing is of sufficiently greater diameter than the ball race compartment to provide a shoulder 54, the wall of the enlarged bore being threaded and having threadedly mounted therein a collar 55, the outer end of which is flush with the corresponding end of the housing and bushing. The inner bore of the collar is of substantially the same diameter as the outer diameter of the nipple 27, clearance for rotation of the nipple being allowed. In the inner circumferential face of the collar there is an annular groove 56 having therein sealing gasket 56a, in which construction the sealing gasket may be omitted in the closure collar nut or bonnet 57, though if desired for economy of having one type only of closure collar nut, that element may be similar to that shown in Fig. 2 with machining of groove 47 omitted. In the modified structure of Fig. 4 the wall of the bushig may, if desired, be thicker than in the device of Fig. 2 to allow for the enlarged bore for housing the collar 55.

In operation, obviously to carry out the prime purpose of the invention there is relative rotation between the main housing body and the nipple, the wear of such rotation however being between the nipple and the interposed bushing. In the apparatus of Figs. 2 and 4 the longitudinal thrust and wear of an unbalanced load due to angular relationship of the connected pipes is borne by the ball bearing, the wear rings 30 and 31 and the bearing flange 29 of the nipple, which arrangement facilitates anti-friction rotation when the thrust is from either end of the coupling. All relative rotation of the parts is facilitated by the lubricating means as described, the filling and replacing of lubrication and the sealing against leakage thereof being as heretofore described. If wearing parts or sealing gaskets become worn it is only necessary to remove the closure collar nut and lubrication nipple and valve, whereupon the bushing and wear rings and sealing gaskets, or either of them may be removed and replaced.

For purposes of control of electrolysis and for electrical insulation purposes the invention has particular advantages in addition to the advantages heretofore described. In some cases as in the use of large heavy fittings it is desirable to form the nipples 27 of very strong material such as steel, and for the sake of lightness, form the bushing and housing bodies of lighter metals such as aluminum alloy. This has often been tried but is not practical because of rapid wear in the softer metal and the fact that many dissimilar metals in close contact develop electrolysis which quickly deteriorates the entire fitting. By interposing the separate bushing, fabricated of an alloy of suitable composition, or of one of many suitable plastics now available, the major parts of the fitting may be constructed of any desirable alloys, and the effect of electrolysis entirely avoided. In the handling of certain fluid, especially acids or alkaline products, the choice of suitable materials is very narrow and the means of avoiding electrolysis in incompatable metals or alloys is of great value.

As an electrical insulating joint, when it is desired to electrically insulate two sections of a fluid conduit, the bushing and the closure collar nut or bonnet, formed of suitable plastics or non-conductors, permits the use of suitable metals for the major members and metal balls for the bearings and at the same time gives effective insulation against the passage of electric current. Many suitable materials are available for use in forming the various parts of the apparatus to avoid electrolysis between two desirable but electrically incompatable materials.

Having described the invention, what is claimed as new and patentable is:

1. A rotative connecting joint for conduit pipes, comprising a main body housing having a tubular faucet bell open at one end for connection of a continuation conduit member and having its opposite end free and open for rotatively receiving therein the spigot end of another conduit member, said housing including a removable closure collar member at the free open end thereof, a replaceable bushing member snugly slidable in the housing and having an axial bore therethrough, a portion of said bore being of relatively greater diameter providing a shoulder, the radially inner wall of said bushing having circumferential and axially longitudinal relatively communicating grooved lubricating channels which also communicate with said bushing bore of greater diameter, a tubular spigot nipple member rotatively mounted in the bushing bore and having a circumferential radially outwardly extended bearing flange extending into the portion of the bushing bore of greater diameter, a race of ball bearings in said bore of greater diameter on each of the opposite axially longitudinal sides of said flange, a wear ring within the housing at each of the opopsite axially longitudinal sides of said races of ball bearings for receiving thereagainst the axially longitudinal wear thrust exerted upon the nipple flange, and means for lubricating the ball bearings and the rotation of the nipple in the bushing comprising a valve-controlled pressure operated filling nipple and a valve-controlled discharge vent intermediate the ends of the housing and the bushing therein and extending through said housing and bushing and communicating with said circumferential and longitudinal grooved channels.

2. A device of the character described having the elements of claim 1 and in which said housing and bushing each have a pair of perforated bores therethrough intermediate the ends thereof, the bores in the housing being in register with the bores in the bushing, the filling nipple and discharge vent being mounted in the respective pairs of registered perforated bores of the housing and bushing and communicating with the grooved channels in the bushing.

3. A rotative connecting joint for conduit pipes having the elements of claim 1 and in which there are sealing gasket means between the housing and bushing, and a gasket within the housing beyond each of the opposite ends of the said lubricating grooves and sealing against the wall of the spigot nipple.

References Cited in the file of this patent

UNITED STATES PATENTS

| Number | Name | Date |
|---|---|---|
| 421,089 | Wood | Feb. 11, 1890 |
| 1,038,396 | Langford | Sept. 10, 1912 |
| 2,015,233 | Pfleger | Sept. 24, 1935 |
| 2,185,822 | Young | Jan. 2, 1940 |
| 2,305,525 | Frazer-Nash | Dec. 15, 1942 |
| 2,337,403 | Myers | Dec. 21, 1943 |
| 2,414,997 | Atkins | Jan. 28, 1947 |
| 2,458,714 | Mahoney | Jan. 11, 1949 |
| 2,489,441 | Warren | Nov. 29, 1949 |
| 2,511,495 | Crot | June 13, 1950 |
| 2,518,443 | Bagnard | Aug. 13, 1950 |
| 2,655,391 | Atkins | Oct. 13, 1953 |